(12) United States Patent
Bae

(10) Patent No.: US 7,859,836 B2
(45) Date of Patent: Dec. 28, 2010

(54) LAPTOP TABLE

(76) Inventor: Seok-Hee Bae, 13-207 Asia Village Apt., 86, Jamsil-7-dong, Songpa-gu, Seoul (KR)

( * ) Notice: Subject to any disclaimer, the term of this patent is extended or adjusted under 35 U.S.C. 154(b) by 94 days.

(21) Appl. No.: 11/568,532

(22) PCT Filed: Aug. 29, 2006

(86) PCT No.: PCT/KR2006/003408

§ 371 (c)(1),
(2), (4) Date: Oct. 31, 2006

(87) PCT Pub. No.: WO2007/029937

PCT Pub. Date: Mar. 15, 2007

(65) Prior Publication Data

US 2009/0154079 A1 Jun. 18, 2009

(30) Foreign Application Priority Data

Sep. 9, 2005 (KR) .................. 10-2005-0084315
Jan. 25, 2006 (KR) .................. 10-2006-0007912
Aug. 23, 2006 (KR) .................. 10-2006-0080081

(51) Int. Cl.
*G06F 1/16* (2006.01)
*H05K 5/00* (2006.01)
*H05K 7/00* (2006.01)

(52) U.S. Cl. .................. 361/679.55; 108/50.02

(58) Field of Classification Search ............ 361/679.55, 361/679.02; 248/122.1, 124.1; 710/303, 710/304; 312/223.1–223.3; 108/50.01, 50.02

See application file for complete search history.

(56) References Cited

U.S. PATENT DOCUMENTS 4,854,538 A * 8/1989 Von Schalscha ....... 248/346.03

(Continued)

FOREIGN PATENT DOCUMENTS

JP 11-053054 2/1999

(Continued)

OTHER PUBLICATIONS

International Search Report-PCT/KR2006/003408 dated Dec. 4, 2008.

(Continued)

*Primary Examiner*—Jayprakash N Gandhi
*Assistant Examiner*—Adrian S Wilson
(74) *Attorney, Agent, or Firm*—Jae Y. Park; Kile Park Goekjian Reed & McManus

(57) ABSTRACT

Disclosed herein is a laptop table including a laptop station, on which a laptop computer is disposed. The laptop station has a connection port set and a power supply unit integrally mounted therein. The connection port set and the power supply unit of the laptop station is connected to an external port set and a power supply unit of the laptop computer. A data storage unit, such as a hard disc drive, a flash memory set, and a CD/DVD ROM drive, is integrally mounted in the laptop station. The laptop station is disposed on a supporting plate of a movable exclusive table, which can be moved and the height of which can be adjusted, such that the laptop station and the supporting plate can be engaged with or disengaged from each other by an engagement unit.

24 Claims, 13 Drawing Sheets

U.S. PATENT DOCUMENTS

| | | | | |
|---|---|---|---|---|
| 4,946,120 | A * | 8/1990 | Hatcher | 248/183.2 |
| 5,240,215 | A * | 8/1993 | Moore | 248/279.1 |
| 5,436,792 | A * | 7/1995 | Leman et al. | 361/679.44 |
| D368,706 | S * | 4/1996 | Mieki | D14/451 |
| D371,769 | S * | 7/1996 | Shima et al. | D14/434 |
| 5,630,566 | A * | 5/1997 | Case | 248/122.1 |
| 5,645,434 | A * | 7/1997 | Leung | 361/735 |
| 5,697,686 | A * | 12/1997 | Miller et al. | 312/194 |
| D390,314 | S * | 2/1998 | Chen | D34/23 |
| 5,751,548 | A * | 5/1998 | Hall et al. | 361/679.46 |
| 5,769,369 | A * | 6/1998 | Meinel | 248/176.1 |
| 5,859,762 | A * | 1/1999 | Clark et al. | 361/679.54 |
| 5,924,807 | A | 7/1999 | Ambrose et al. | |
| 5,966,807 | A | 10/1999 | Quinney | |
| 6,094,347 | A * | 7/2000 | Bhatia | 361/679.55 |
| 6,213,438 | B1 * | 4/2001 | Ostby et al. | 248/122.1 |
| 6,222,728 | B1 * | 4/2001 | Jaggers et al. | 361/679.55 |
| 6,239,971 | B1 * | 5/2001 | Yu et al. | 361/679.55 |
| 6,256,193 | B1 * | 7/2001 | Janik et al. | 361/679.59 |
| 6,290,534 | B1 * | 9/2001 | Sadler | 439/534 |
| 6,321,340 | B1 * | 11/2001 | Shin et al. | 439/131 |
| 6,370,021 | B1 * | 4/2002 | Hinzpeter et al. | 361/679.6 |
| 6,443,543 | B1 * | 9/2002 | Chiang | 312/223.3 |
| 6,491,276 | B1 * | 12/2002 | Belliveau | 248/372.1 |
| 6,493,217 | B1 * | 12/2002 | Jenkins, Jr. | 361/679.6 |
| 6,536,728 | B1 * | 3/2003 | Hagglund et al. | 248/286.1 |
| 6,697,252 | B2 * | 2/2004 | Maeda | 361/679.57 |
| 6,707,668 | B2 * | 3/2004 | Huang | 361/679.55 |
| 6,722,673 | B1 * | 4/2004 | Hamlin | 108/50.01 |
| 7,009,840 | B2 * | 3/2006 | Clark et al. | 361/679.41 |
| D519,121 | S * | 4/2006 | Zamanian | D14/447 |
| 7,035,100 | B2 * | 4/2006 | Lord | 361/679.41 |
| 7,052,296 | B2 * | 5/2006 | Yang et al. | 439/165 |
| 7,121,514 | B2 * | 10/2006 | Twyford | 361/679.02 |
| 7,129,931 | B2 * | 10/2006 | Pappas | 361/679.07 |
| 7,130,186 | B2 * | 10/2006 | Yu | 361/679.56 |
| 7,236,356 | B2 * | 6/2007 | Ulla et al. | 361/679.55 |
| 7,424,991 | B2 * | 9/2008 | Kim et al. | 248/125.9 |
| 7,487,940 | B2 * | 2/2009 | Saez et al. | 248/176.1 |
| D597,557 | S * | 8/2009 | Hu | D14/496 |
| 7,604,206 | B2 * | 10/2009 | Jung et al. | 248/133 |
| 2003/0231466 | A1 * | 12/2003 | Huang | 361/687 |
| 2005/0150432 | A1 * | 7/2005 | Wen | 108/38 |
| 2006/0061964 | A1 * | 3/2006 | Cheng | 361/686 |
| 2006/0250367 | A1 * | 11/2006 | Tabasso et al. | 345/168 |
| 2007/0035917 | A1 * | 2/2007 | Hotelling et al. | 361/683 |

FOREIGN PATENT DOCUMENTS

| | | |
|---|---|---|
| JP | 11-238984 | 8/1999 |
| JP | 2004-000631 | 1/2004 |
| KR | 20-0180145 | 2/2000 |
| KR | 20-0188381 | 4/2000 |
| KR | 20-0347016 | 3/2004 |
| WO | 99/46439 | 11/1999 |

OTHER PUBLICATIONS

Written Opinion-PCT/KR2006/003408 dated Dec. 4, 2008.
International Preliminary Report on Patentability-PCT/KR2006/003408.

* cited by examiner

[Fig. 1]
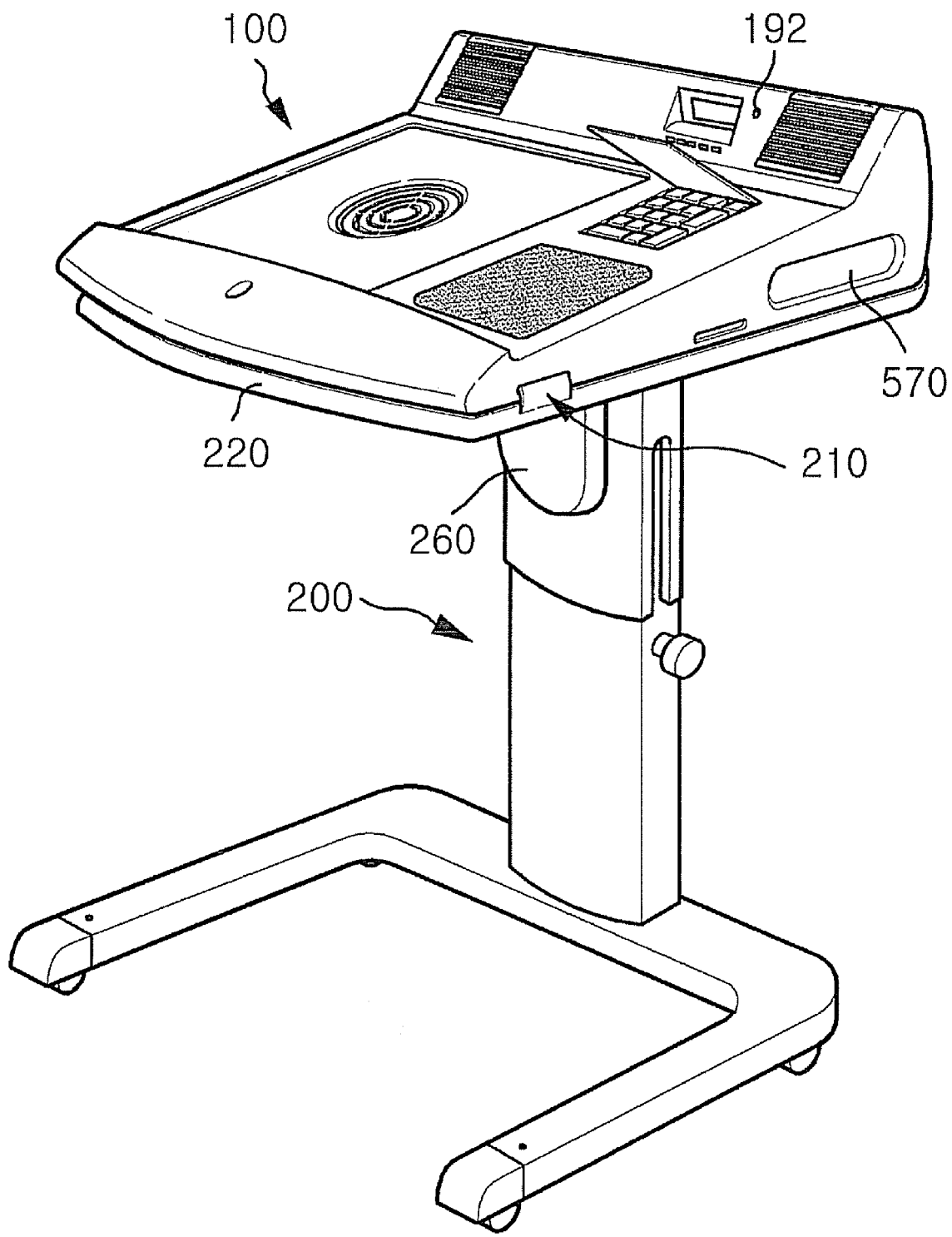

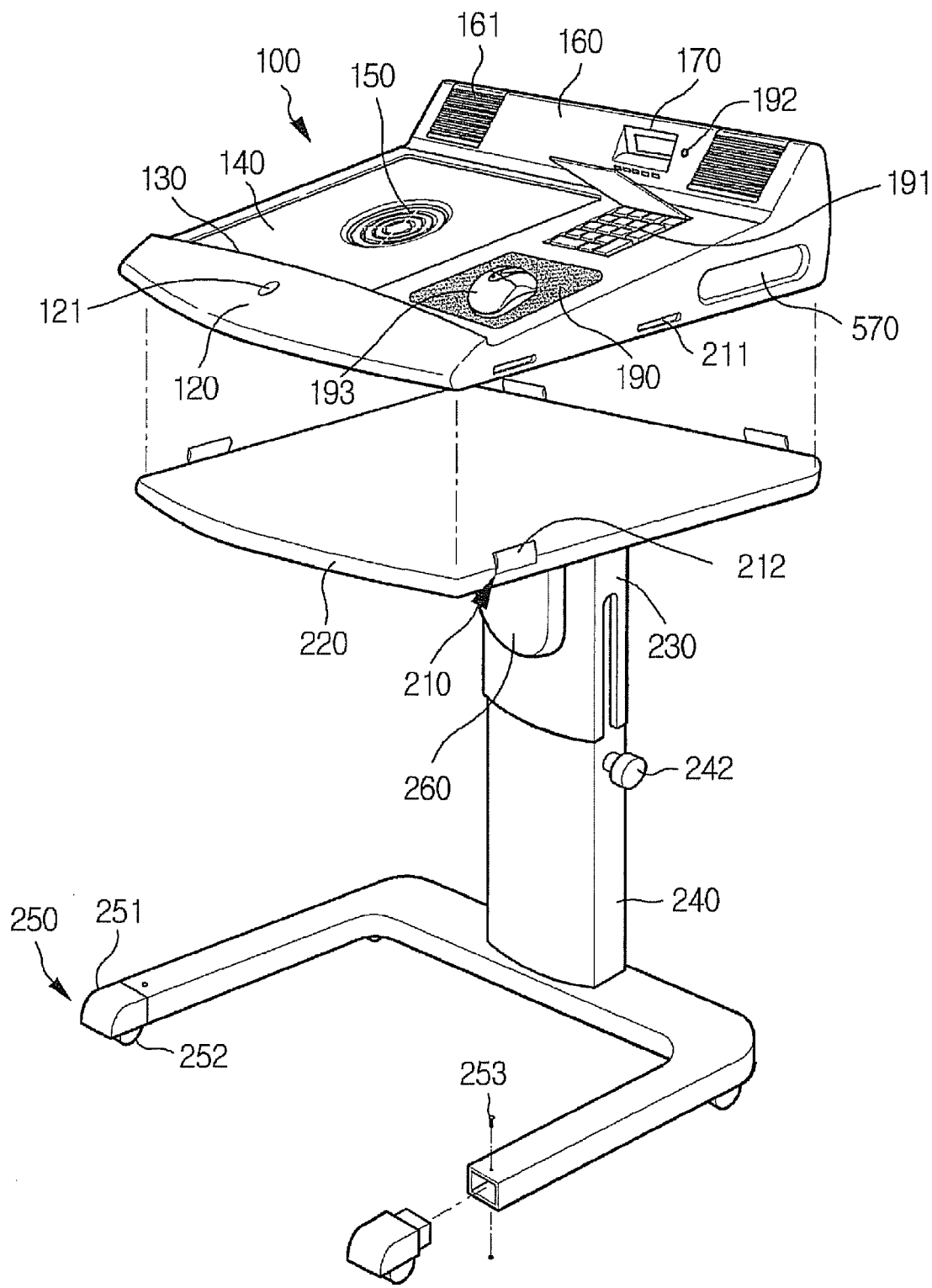
[Fig. 2]

[Fig. 3]
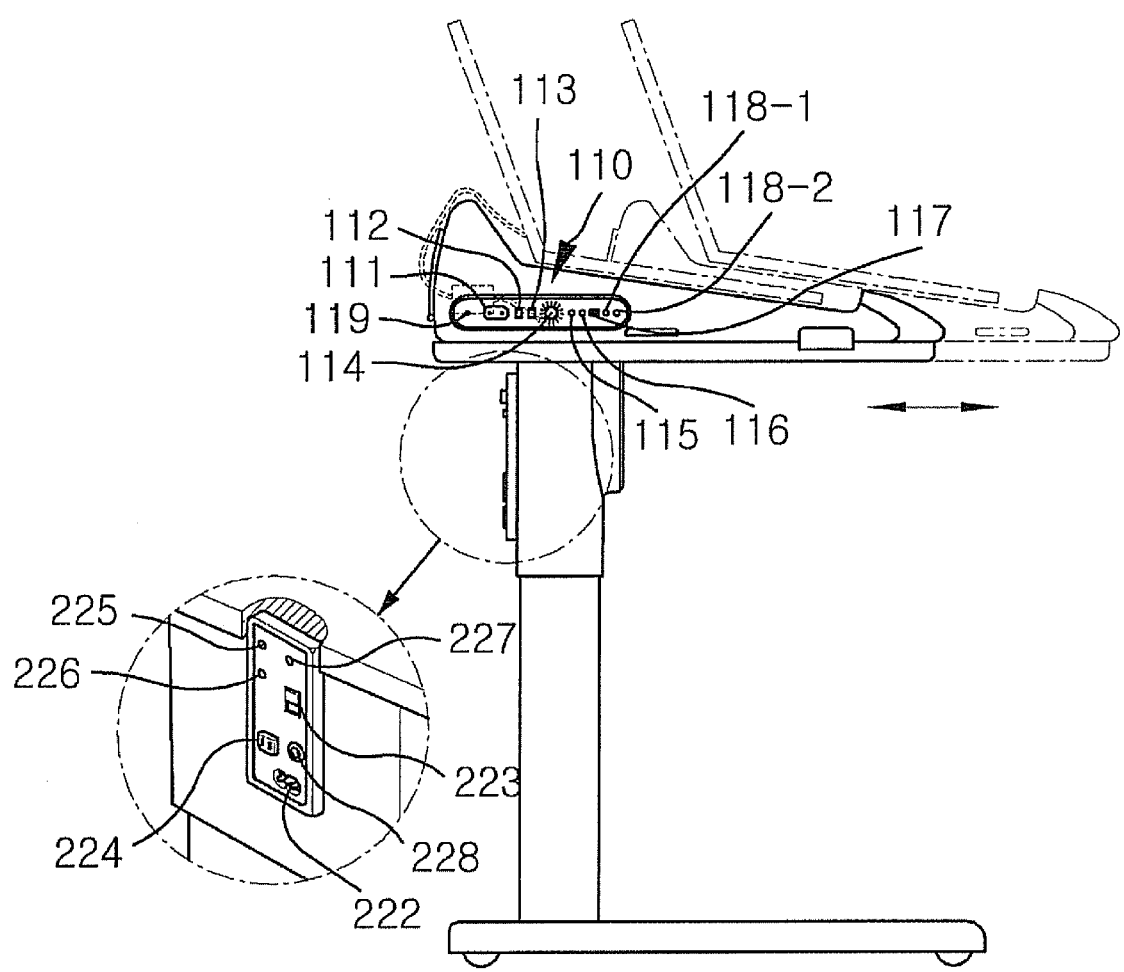

[FIG.4]
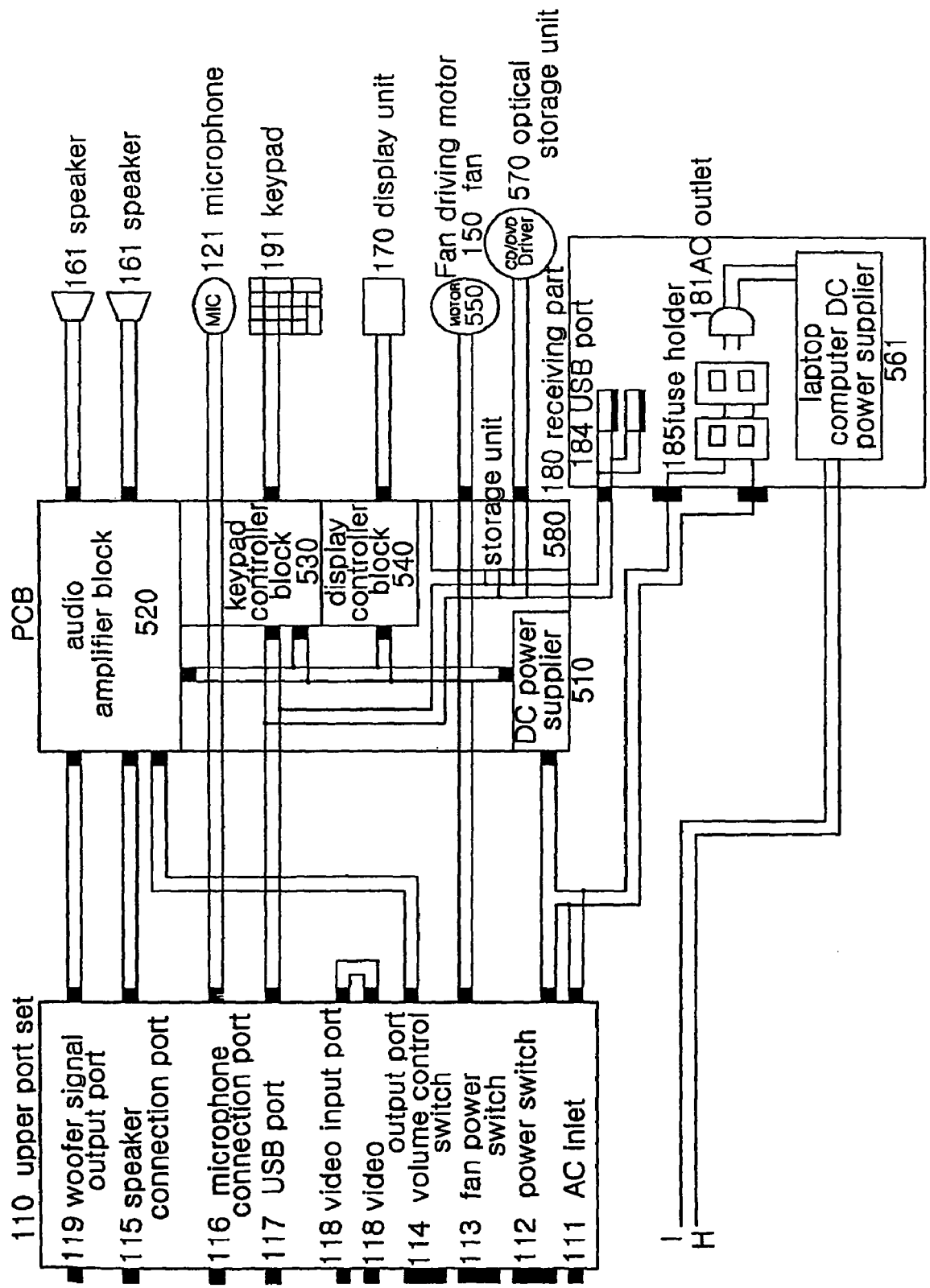

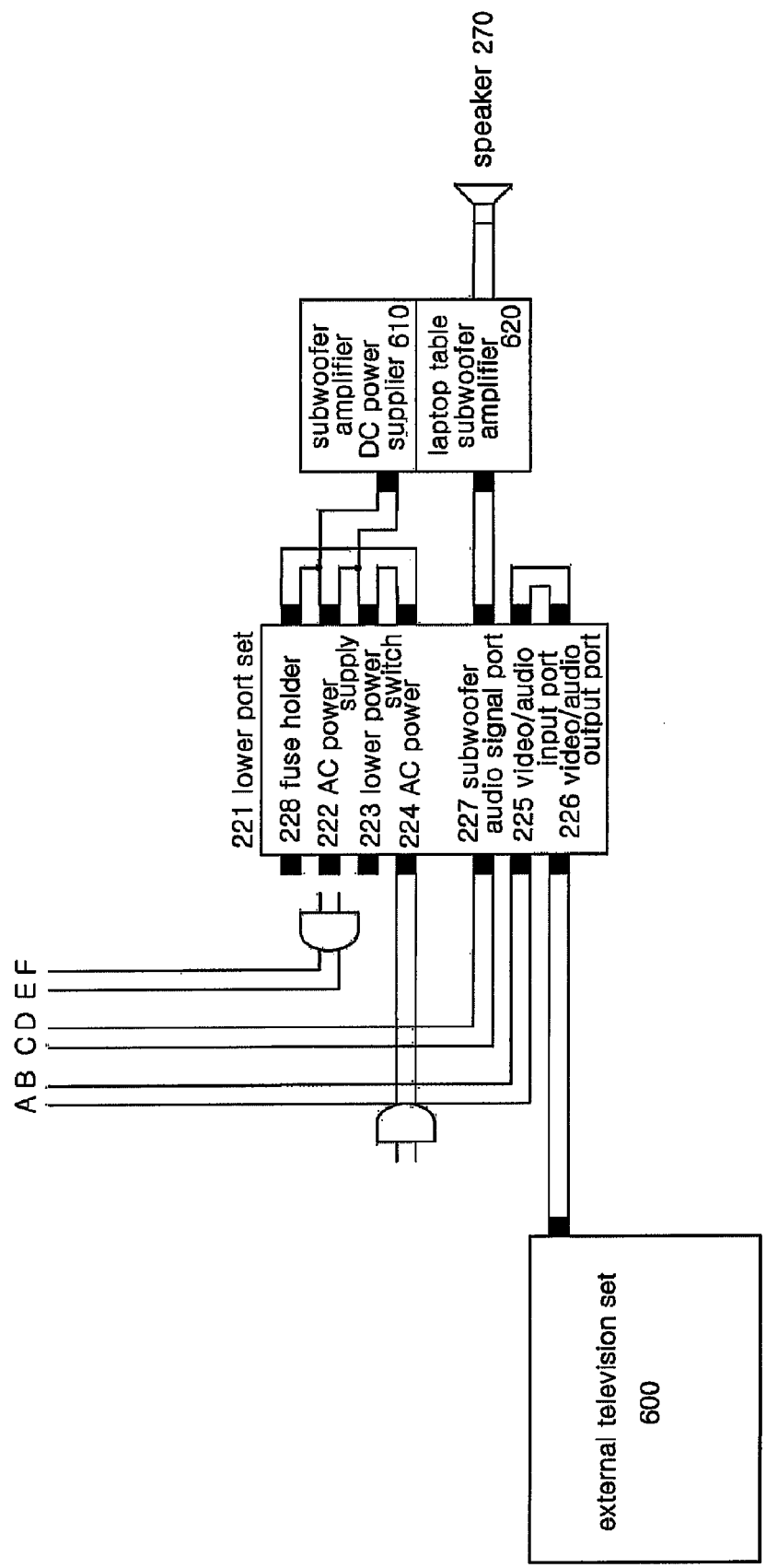
[Fig. 5]

[Fig. 6]
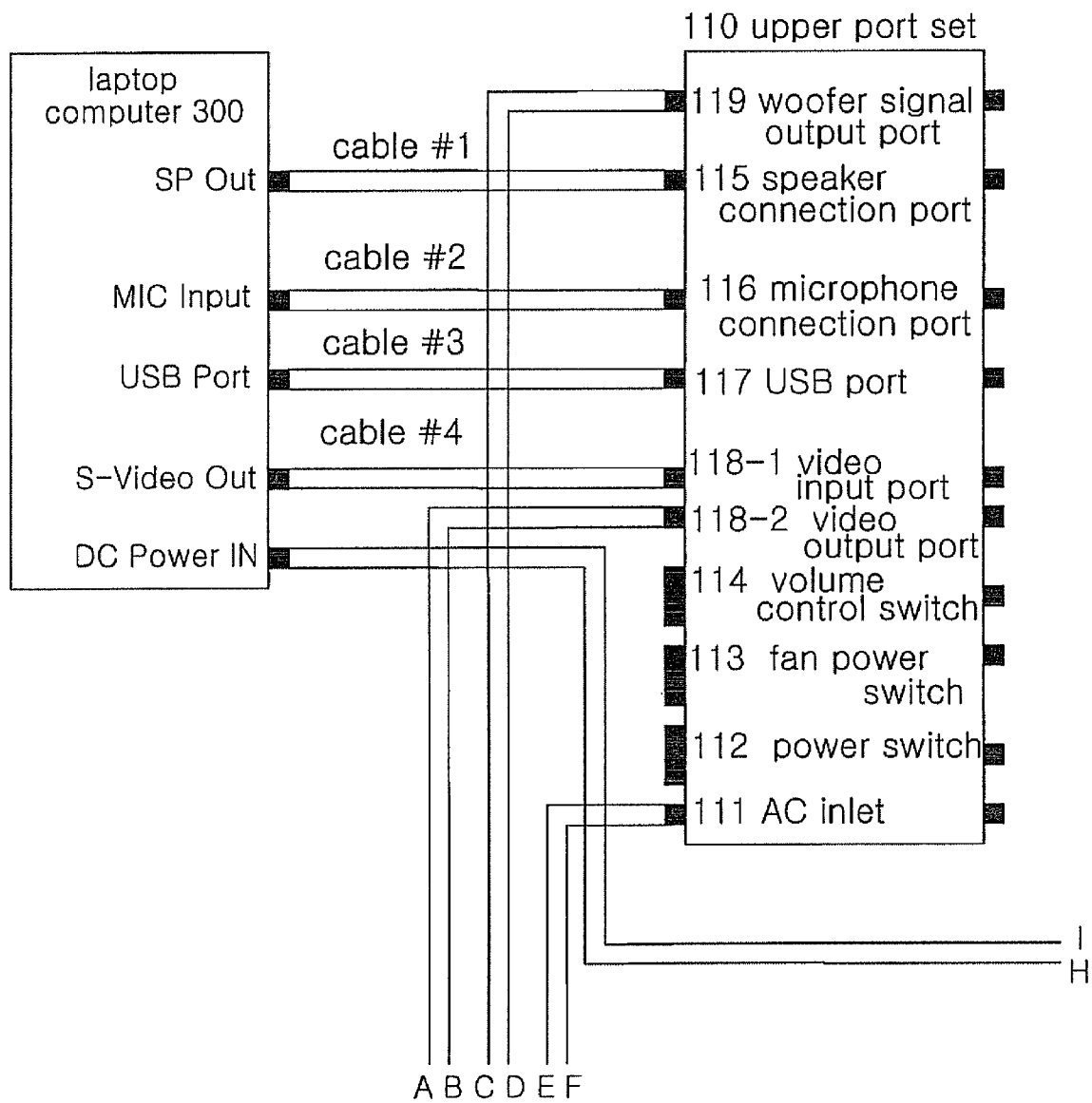

[Fig. 7]
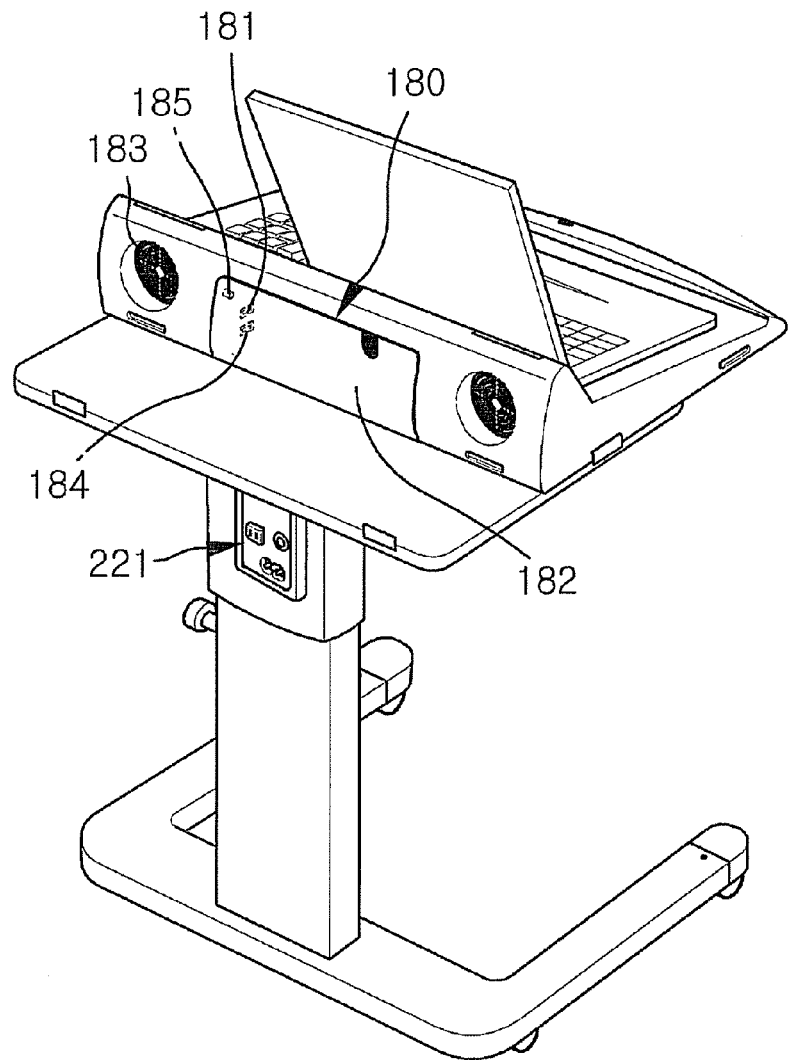
[Fig. 8]
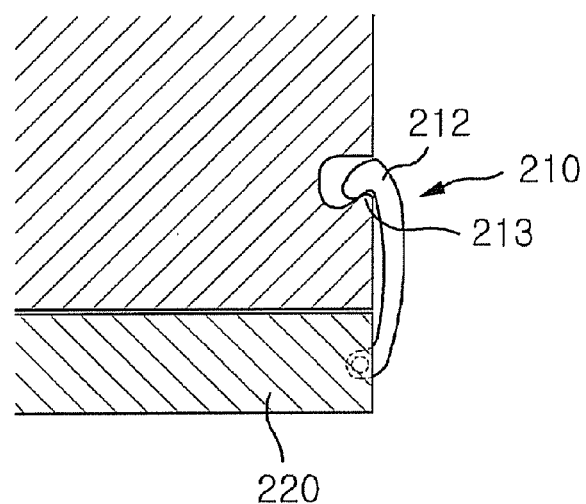

[Fig. 9]
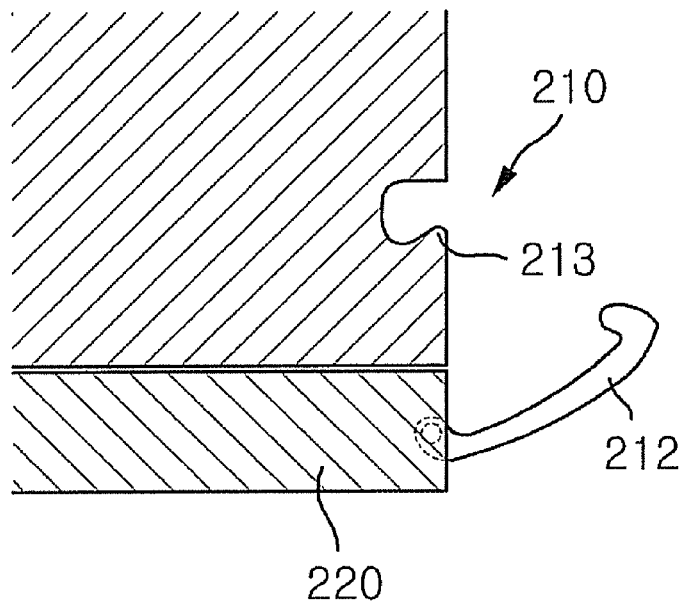
[Fig. 10]
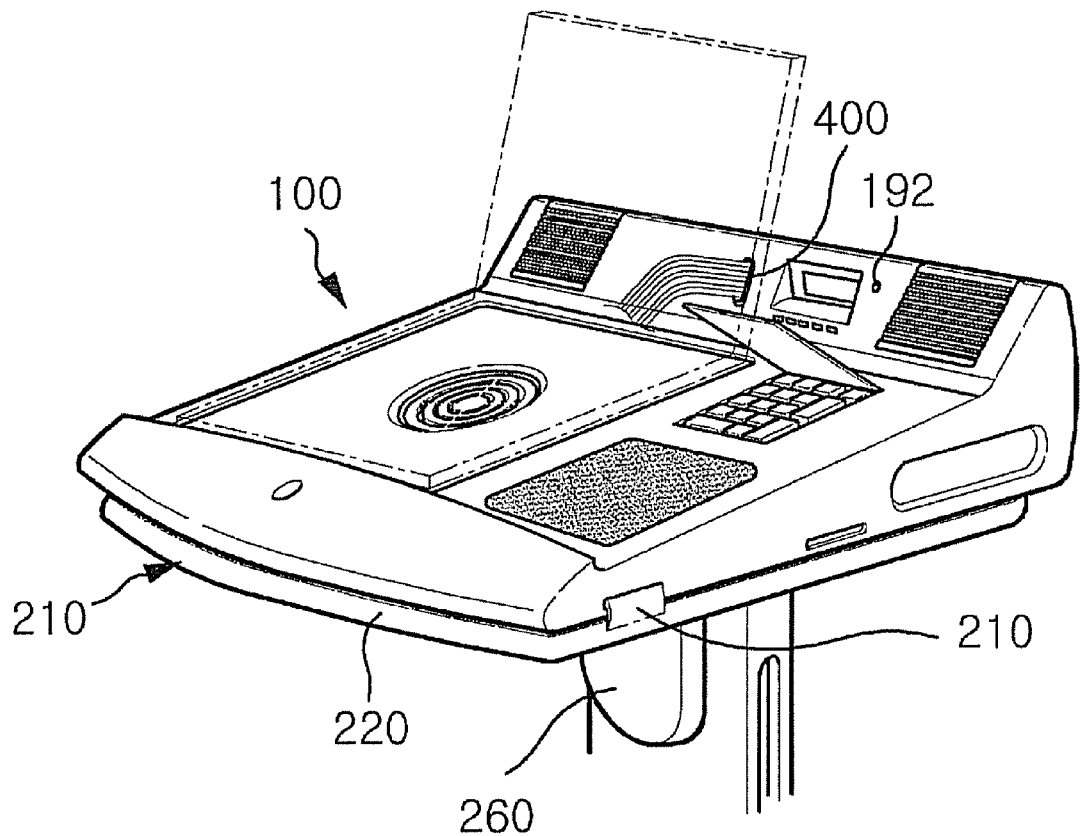

[FIG.11]
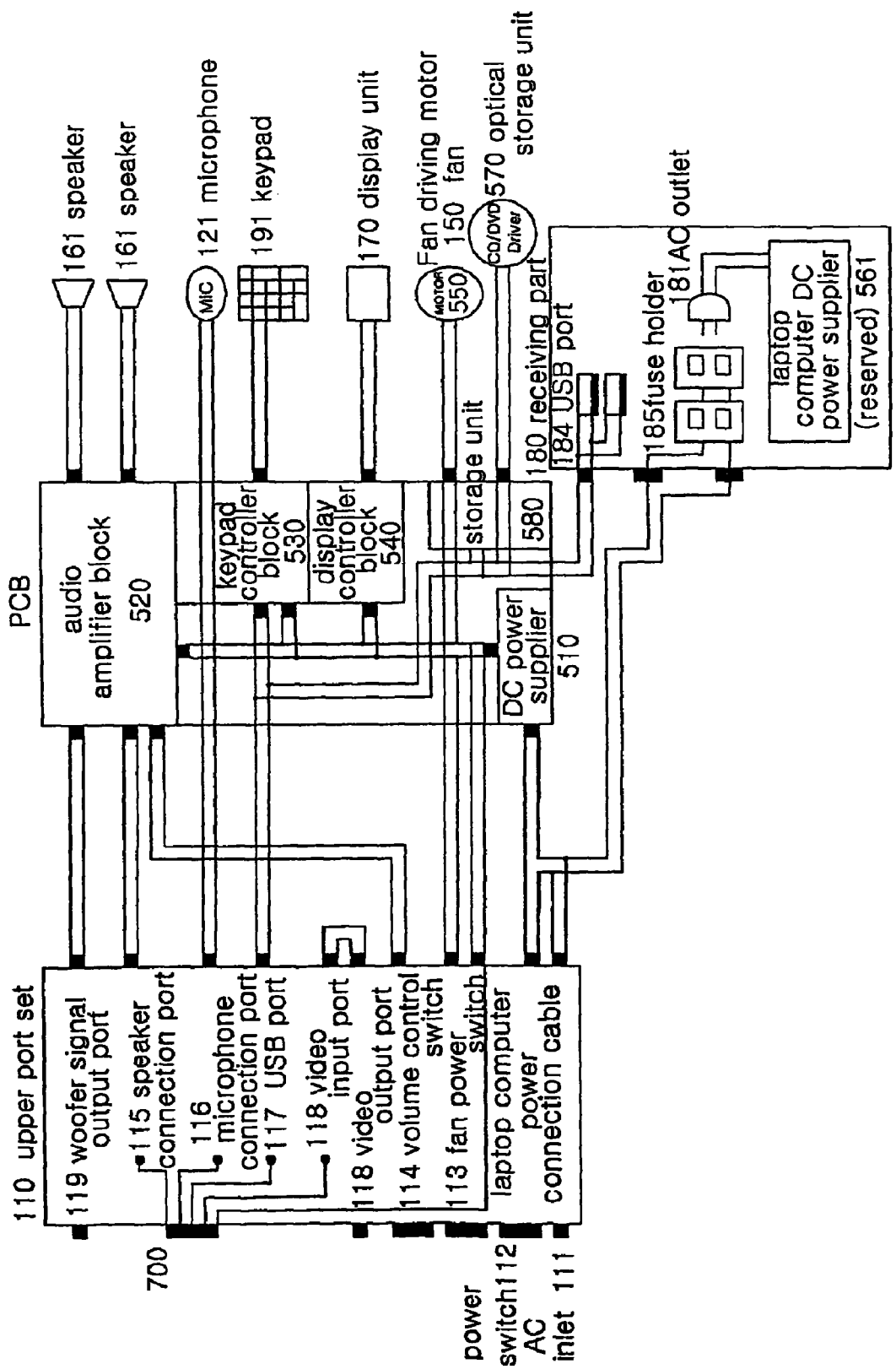

[Fig. 12]
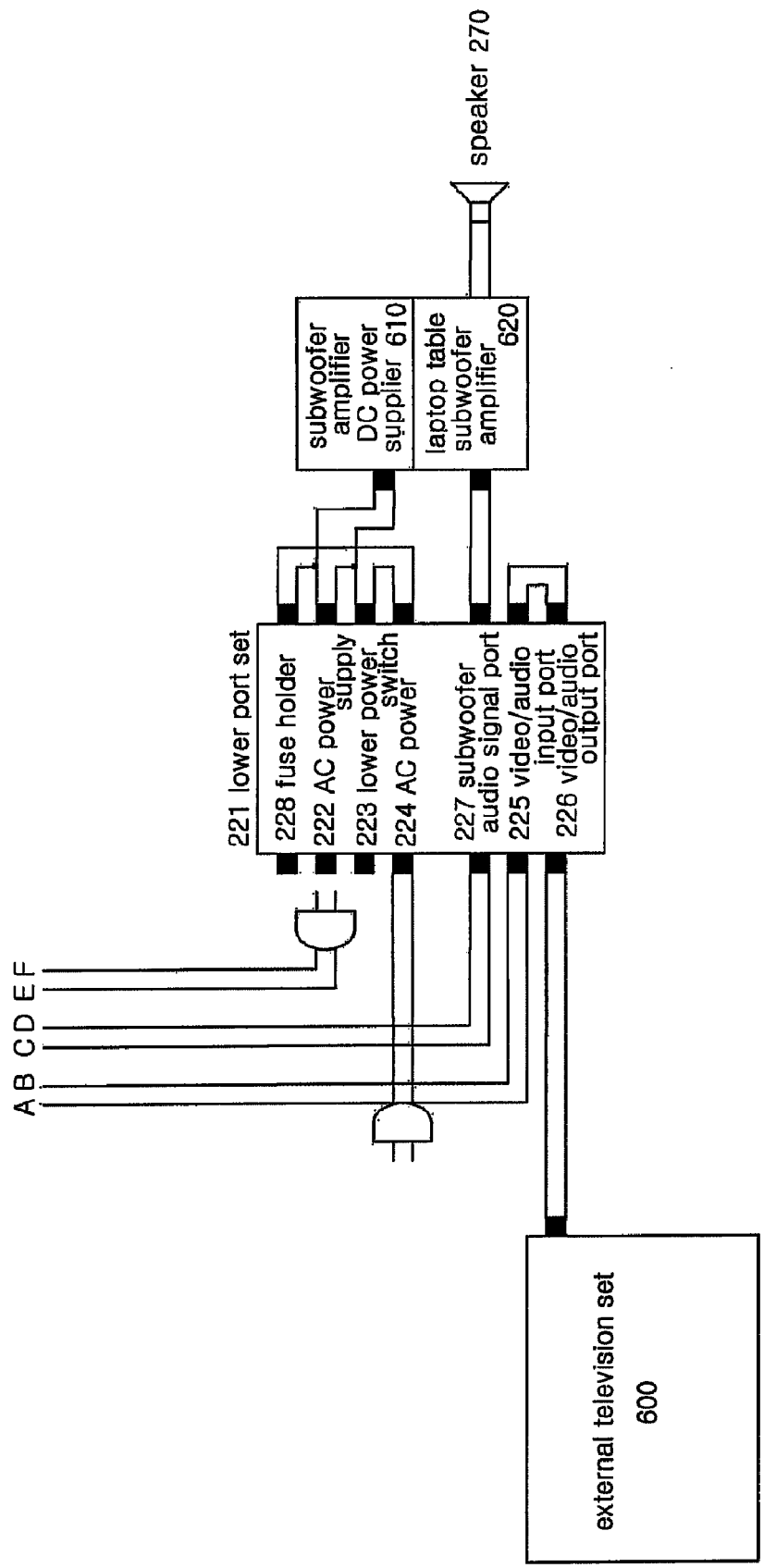

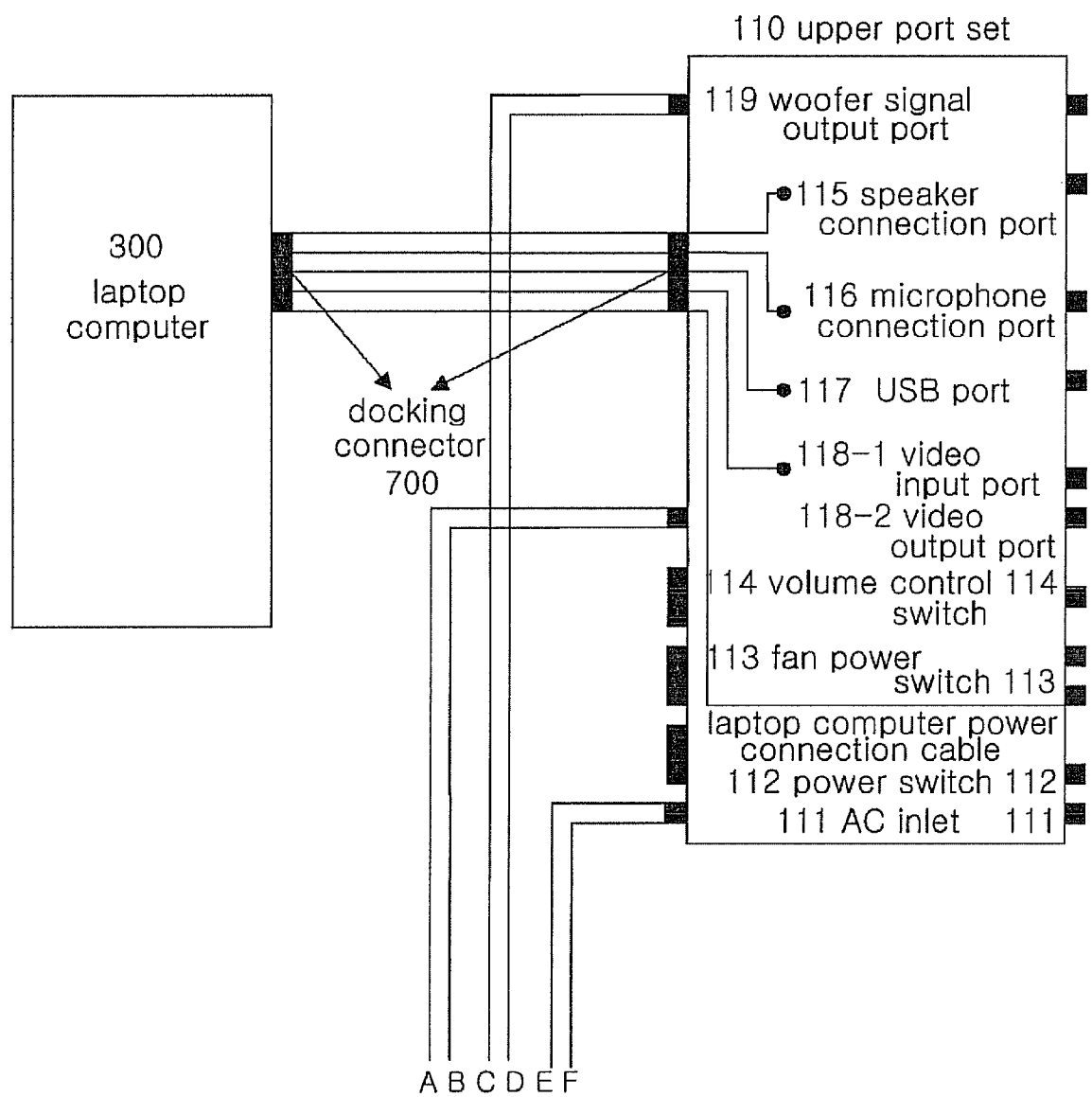
[Fig. 13]

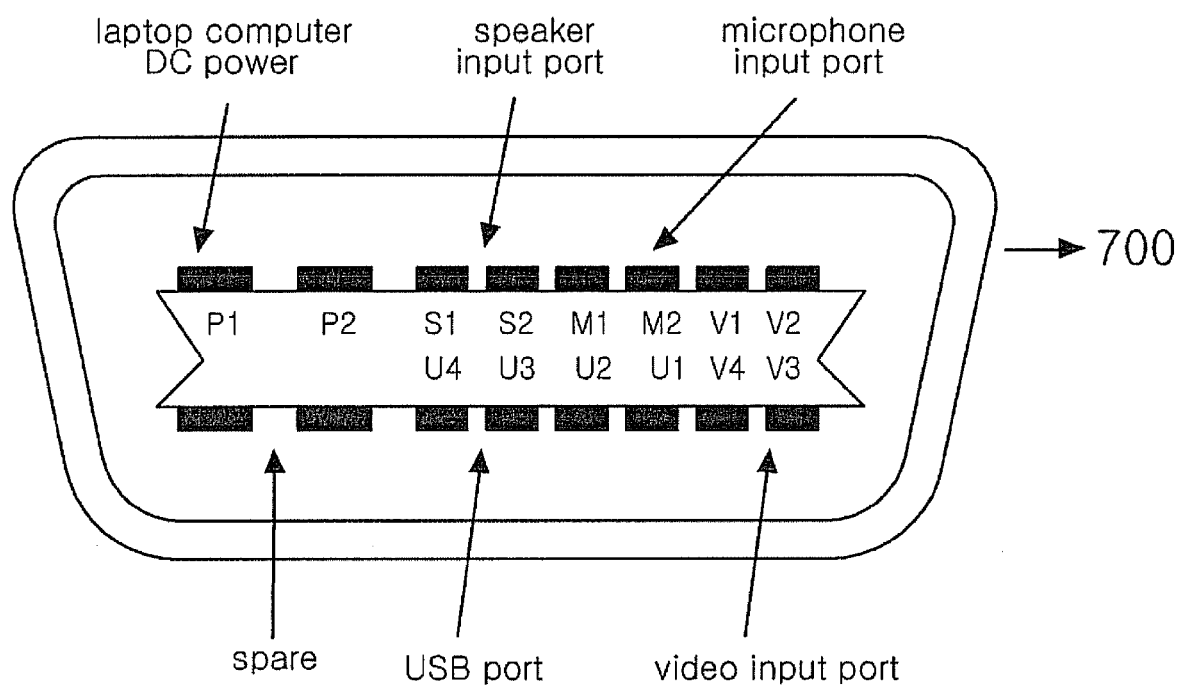
[Fig. 14]

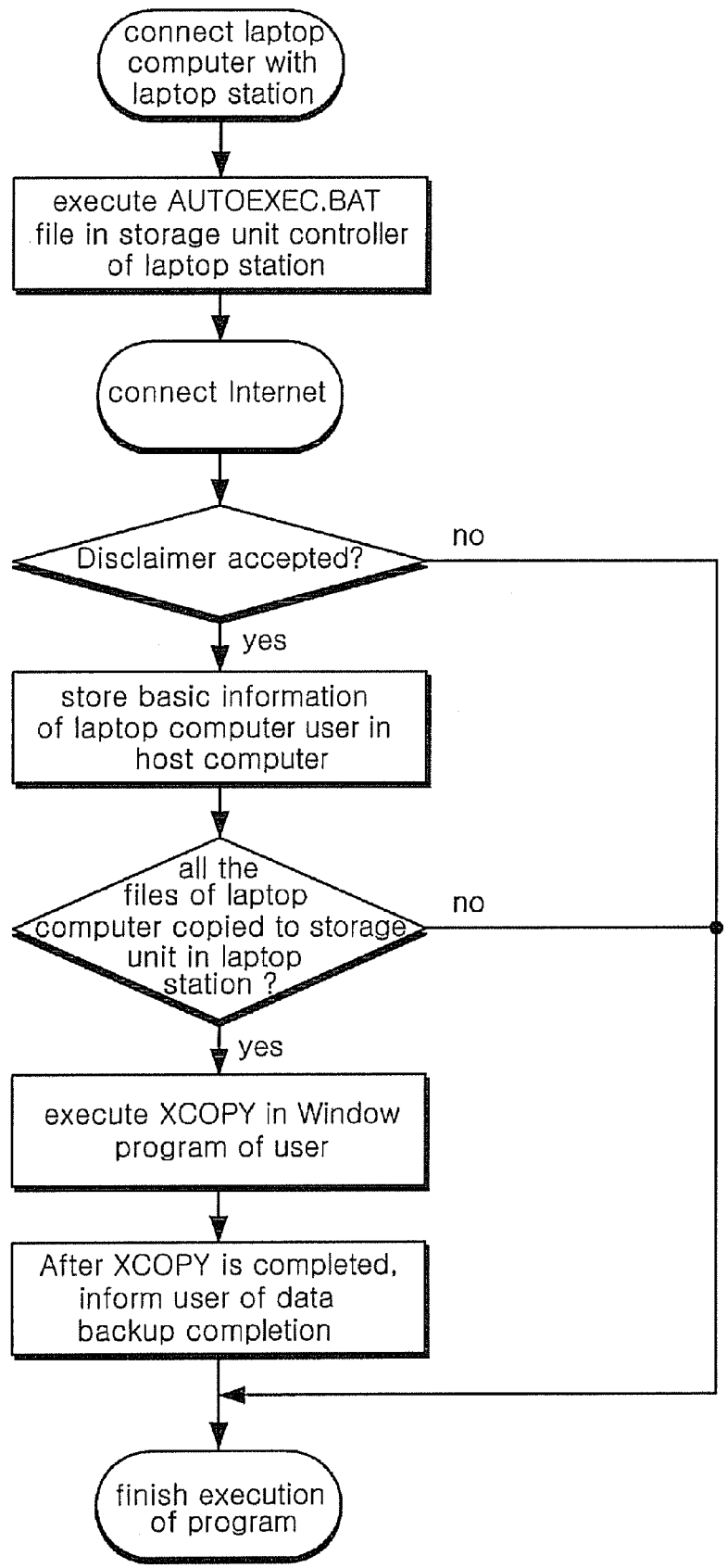
[Fig. 15]

LAPTOP TABLE

BACKGROUND OF THE INVENTION

1. Field of the Invention

The present invention relates to a laptop table for the exclusive use of laptop computers, and, more particularly, to a laptop table including a laptop station, on which a laptop computer is disposed, wherein the laptop station has a connection port set and a power supply unit integrally mounted therein, the connection port set and the power supply unit of the laptop station being connected to an external port set and a power supply unit of the laptop computer, a data storage unit including storage units, such as a hard disc drive and a flash memory set, and an optical storage unit, such as a CD/DVD ROM drive, is integrally mounted in the laptop station, and the laptop station is disposed on a supporting plate of a movable exclusive table, which can be moved and the height of which can be adjusted, such that the laptop station can be engaged with or disengaged from the supporting plate of the movable exclusive table by an engagement unit.

2. Description of the Related Art

Generally, most conventional computer tables are exclusively used for desktop computers. On the main upper plate of each of the conventional desktop tables are disposed a monitor and a speaker set. Under the main upper plate of each of the conventional desktop tables is formed a drawer, in which a keyboard is disposed, by which the size of the main upper plate can be reduced as much as the space occupied by the keyboard.

On the other hand, laptop computers are recognized to be portable computers. For this reason, minimal research has been conducted into laptop tables for the exclusive use of laptop computers. When a user places a laptop computer on a desk to use the laptop computer, however, peripheral devices and cables of the laptop computer occupy the limited area of the desk, and therefore, it is difficult and inconvenient for the user to dispose the laptop computer on the desk. Even when the user uses the laptop computer after placing the laptop computer on the desk, the peripheral devices of the laptop computer are disorganized, and therefore, the arrangement of the peripheral devices of the laptop computer is difficult and inconvenient. When the user uses the laptop computer on his/her lap, the user may feel discomfort due to heat generated from the laptop computer. Consequently, it is difficult for the user to comfortably use the laptop computer on his/her lap.

When the user places the laptop computer on a common movable table, and then uses the laptop computer while sitting on a sofa, the frame of the common movable table does not fit beneath the sofa, since the wheels of the common movable table are large, and the thickness of the frame, at which the wheels are mounted, is also large. As a result, it is difficult for the user to pull the common movable table toward him/her, and therefore, the use of the laptop computer is inconvenient.

Furthermore, the conventional computer table does not have a space enough to receive or dispose the peripheral devices and the cables of the laptop computer. As a result, the peripheral devices and the cables of the laptop computer are not neatly arranged, and therefore, a space necessary for the user to use the laptop computer is not sufficiently provided on the conventional computer table. Consequently, the use of the laptop computer is inconvenient.

SUMMARY OF THE INVENTION

Therefore, the present invention has been made in view of the above problems, and it is an object of the present invention to provide a laptop table including a laptop station securely coupled with a supporting plate of a movable exclusive table such that peripheral devices of a laptop computer are neatly disposed, wherein the laptop station can be separated from the movable exclusive table without disengagement of a power adaptor and cables of the laptop computer such that a user can easily and conveniently use the laptop computer anywhere.

It is another object of the present invention to provide a laptop table that is capable of easily and conveniently accomplishing coupling of the laptop station with the movable exclusive table and separation of the laptop station from the movable exclusive table in one action.

It is another object of the present invention to provide a laptop table that is capable of allowing the user to pull the movable exclusive table toward himself/herself while the laptop station is coupled with the movable exclusive table so that the laptop table can be conveniently used by the user, allowing the user to move the laptop station forward relative to the movable exclusive table, while the laptop station is coupled with the movable exclusive table, so that the laptop table can be conveniently used by the user, or allowing the user to separate the laptop station from the movable exclusive table so that the laptop table can be conveniently used by the user.

It is another object of the present invention to provide a laptop table that is capable of allowing the user to use communication functions, such as Internet, using a wireless router even when the laptop station is separated from the movable exclusive table.

It is another object of the present invention to provide a laptop table that is capable of allowing the user to use the laptop computer without wrist fatigue by the provision of a wrist rest at the lower part of the laptop station.

It is another object of the present invention to provide a laptop table that is capable of reducing heat generated from the laptop computer.

It is yet another object of the present invention to provide a laptop table that is capable of providing quality sound to the user of the laptop computer by reinforcing sound output from the laptop computer.

In accordance with the present invention, the above and other objects can be accomplished by the provision of a laptop table comprising: a movable exclusive table having a supporting plate; a laptop station disposed on the supporting plate, the laptop station having a connection port set and a power supply unit integrally mounted therein, the connection port set and the power supply unit of the laptop station being connected to an external port set and a power supply unit of a laptop computer, and a data storage unit including storage units, such as a hard disc drive and a flash memory set, and an optical storage unit, such as a CD/DVD ROM drive, is integrally mounted therein; and an engagement unit formed at opposite sides and the rear end of the laptop station and at the supporting plate of the movable exclusive table for engaging or disengaging the laptop station with or from the supporting plate of the movable exclusive table.

Preferably, the movable exclusive table includes: a height adjustment bar vertically attached to the lower part of the supporting plate; a supporting frame fitted in the height adjustment bar such that the height of the height adjustment bar can be adjusted by a height adjusting knob; and a plurality of roller parts mounted at the ends of the supporting frame, in such a manner that the roller parts can be separated from the supporting frame, for moving the movable exclusive table.

Preferably, the height adjustment bar is constructed such that a wireless router and/or a modem for wireless Internet, a video input/output port for a red/green/blue (RGB) cable, a component video output (Y/Pb/Pr) cable, a high-definition multimedia interface (HDMI) cable, or an S-video cable, a power switch, and a plug receptacle are mounted in the height adjustment bar or on the height adjustment bar as occasion demands.

Preferably, the laptop station includes: an inclined part; a wrist rest formed at the lower end of the inclined part, the wrist rest extending from the inclined part; and an inclined protrusion formed at the upper end of the inclined part, the inclined protrusion having a plurality of speakers mounted therein. The laptop station further includes: a small-sized microphone mounted in the wrist rest such that communication can be carried out without using a headset during conversation; a plurality of fan grills formed at the center of the inclined part for dissipating heat generated from the laptop computer; and a plurality of fans mounted in the fan grills.

Preferably, the laptop station is provided at one side thereof with a port set including at least one selected from a group consisting of a microphone connection port, a speaker/amplifier input port, a universal serial bus (USB) port, a video input port for an IEEE 1394 cable, an S-video cable, a Y/Pb/Pr cable, or an RGB cable, a volume switch, a fan power switch, an amplifier power switch, and a plug receptacle.

Meanwhile, the microphone connection port, the speaker/amplifier input port, the USB port, the video input and output port for the S-video cable, the Y/Pb/Pr cable, or the RGB cable may be manufactured in the form of a standardized connection port having a plurality of pins such that a connection port used for a docking station of the laptop computer or various ports of the laptop computer can be easily and conveniently connected to various external devices or ports through the standardized connection port.

In the laptop station is also mounted a storage unit, such as a hard disk drive or a flash memory set, which is utilized as an auxiliary storage unit of the laptop computer. The storage unit is also used as an automatic data backup device when the laptop computer is lost or a hard disk of the laptop computer is out of order.

In the laptop station is also mounted an optical storage unit, such as a CD/DVD ROM drive, for allowing a user to easily install music, movies, or programs.

Also, the laptop station may be provided with a simple-structure display unit, for example, a liquid crystal display (LCD) or a light emitting diode (LED), which is used to monitor the port connection state or the operation state of various cables.

Preferably, the laptop station is provided at the rear part thereof with a receiving part for receiving an input and output port, including a USB port, a power adaptor and a power cable of the laptop computer, the receiving part having an alternating current (AC) outlet, which is connected to the power supply unit for supplying power to the power supply unit, mounted therein. Also, the laptop station further includes air circulating grills disposed at opposite sides of the receiving part for circulating air. Meanwhile, the output ports to external devices or ports corresponding to the port set disposed at one side of the laptop station or the docking connector may be disposed at the receiving part formed at the rear part of the laptop station such that the arrangement of the cables is easily and conveniently carried out.

The laptop station is easily engaged with or disengaged from the movable exclusive table by the engagement unit, which is mounted at the opposite sides and the rear end of the supporting plate of the movable exclusive table.

Preferably, the engagement unit comprises: engaging plates hingedly connected to the opposite sides and the rear end of the supporting plate of the movable exclusive table such that the engaging plates can be rotated in a hinged fashion; and engaging grooves formed at the opposite sides and the rear end of the laptop station such that the engaging grooves correspond to the engaging plates, respectively, the engaging plates being securely engaged in the corresponding engaging grooves while hook parts formed at the ends of the engaging plates are caught by catching protrusions formed in the engaging grooves, respectively.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a perspective view illustrating a laptop table according to a first preferred embodiment of the present invention;

FIG. 2 is an exploded perspective view of the laptop table according to the first preferred embodiment of the present invention shown in FIG. 1;

FIG. 3 is a side view of the laptop table according to the first preferred embodiment of the present invention shown in FIG. 1;

FIG. 4 is a block diagram illustrating the connection between port sets;

FIG. 5 is a block diagram illustrating the connection between an upper port set and a lower port set;

FIG. 6 is a block diagram illustrating the connection between a laptop computer and the upper port set;

FIG. 7 is a perspective view of the laptop table according to the first preferred embodiment of the present invention shown in FIG. 1 illustrating the rear part of the laptop table;

FIG. 8 is a sectional view before the operation of the engagement part is performed;

FIG. 9 is a sectional view after the operation of the engagement part is performed;

FIG. 10 is a perspective view of a laptop table according to a second preferred embodiment of the present invention illustrating a docking connector mounted at a laptop station of the laptop table;

FIG. 11 is a block diagram illustrating the connection between an upper port set and the laptop computer using the docking connector;

FIG. 12 is a block diagram illustrating the connection between the upper port set and a lower port set;

FIG. 13 is a block diagram illustrating the connection between the port sets of the laptop station;

FIG. 14 is a sectional view illustrating the docking connector shown in FIG. 10; and FIG. 15 is a flow chart illustrating an automatic data backup.

DESCRIPTION OF THE PREFERRED EMBODIMENTS

Now, preferred embodiments of the present invention will be described in detail with reference to the accompanying drawings.

FIG. 1 is a perspective view illustrating a laptop table according to a first preferred embodiment of the present invention.

As shown in FIG. 1, a laptop station 100 is disposed on a supporting plate 220 of a movable exclusive table 200. The laptop station 100 is constructed such that the laptop station 100 is coupled with or separated from the supporting plate 220 by an engagement unit 210 formed at opposite sides and the rear end of the supporting plate 220.

FIG. 2 is an exploded perspective view of the laptop table according to the first preferred embodiment of the present invention shown in FIG. 1, FIG. 3 is a side view of the laptop table according to the first preferred embodiment of the present invention shown in FIG. 1, and FIG. 4 is a block diagram of the laptop table according to the first preferred embodiment of the present invention shown in FIG. 1.

As shown in FIGS. 2 and 3, the laptop station 100 is provided at one side thereof with an upper port set 110 including various ports manufactured in the form of a module and a power supply unit. Specifically, the upper port set 110 includes a microphone connection port 116 necessary to input voice to the laptop computer, a speaker/amplifier input port 115 necessary to output voice from the laptop computer to speakers of the laptop station or external speakers, a universal serial bus (USB) port 117 necessary to connect the laptop computer with various peripheral devices in a USB connection fashion, a video input port 118-1 and a video output port 118-2 for an IEEE 1394 cable, an S-video cable, a Y/Pb/Pr cable, an HDMI cable, or an RGB cable, which is necessary to input an external video signal to the laptop computer, a volume switch 114 connected to the speaker port for adjusting sound volume, a fan power switch 113 necessary to drive cooling fans mounted in the laptop station, an amplifier power switch 112 necessary to drive an amplifier mounted in the laptop station, and an alternating current (AC) inlet 111. As occasion demands, the upper port set 110 is manufactured in the form of a module.

Meanwhile, a wire mouse may be directly connected to the USB port of the laptop computer, and therefore, a detailed description of the wire mouse will not be given. When a wireless mouse receiver 192 connected to the USB port in the laptop station 100 and a wireless mouse 193 are used, on the other hand, a convenient computing environment without a mouse wire may be prepared.

FIG. 3 is a side view of the laptop table according to the first preferred embodiment of the present invention shown in FIG. 1. As shown in FIG. 3, the laptop table is provided with a lower port set 221 including a port, a switch, and a power supply unit. Specifically, the lower port set 221 includes a lower AC outlet 224 necessary to supply power to a lower device, a lower power switch 223 necessary to turn on/off power supplied to the lower AC outlet 224, an AC inlet 222, to which a power plug of the laptop computer is connected, a video/audio input port 225, and a video/audio output port 226. The lower port set 221 may further include an audio signal port 227 for a subwoofer and a power fuse holder.

FIG. 4 is a block diagram of the present invention. As shown in FIG. 4, the laptop station 100 includes an upper port set 110, a power supply unit 510 having a transformer for transforming an alternating current (AC) voltage of AC 110V to 220V into a predetermined direct current (DC) voltage, such as DC 5V, DC 12V, or DC 16V, and a rectifier for rectifying an AC current to a DC current, an amplifier 520 for amplifying audio inputted from a speaker/amplifier input port 115 of the upper port set 110 connected to a speaker output port of the laptop computer to a predetermined level, and left and right speakers 161 for transmitting the audio amplified by the amplifier 520 to the outside. The laptop station 100 further includes a microphone 121 for inputting audio, a numeric keypad 191 for inputting numbers and function signals, and a keypad controller 530 for receiving the function signals inputted from the numeric keypad 191 and processing the function signals.

Also, the laptop station 100 further includes a display controller 540 for generating a control signal for display, and a display unit 170 connected to the display controller 540 for displaying functions and data on the screen, and a driving motor 550 for driving a fan 150. In addition, the laptop station 100 further includes a receiving part 180 for receiving a USB port 184 for data communication, a fuse holder 185 for overvoltage interruption, an AC outlet 181, and a power supply unit 561.

As shown in FIG. 5, on the other hand, the laptop table includes a lower port set 221 having a video output port 226 for performing video connection with an external television set 600, a power supply unit 610 for supplying power to a complex case 260, an amplifier for driving and amplifying a woofer signal output through the connection between a woofer amplifier output port 119 of the upper port set 110 and a woofer signal input port 227 of the lower port set 221, and a speaker for transmitting a signal outputted from the amplifier 620 to the outside.

FIG. 6 illustrates the connection between a laptop computer 300 and the upper port set 110. As shown in FIG. 6, a speaker port (SP Out) of the laptop computer 300 and a speaker/amplifier input port 115 of the upper port set 110 are connected with each other via a bundle cable #1, a microphone input port (MIC Input) of the laptop computer 300 and a microphone connection part 116 of the upper port set 110 are connected with each other via a bundle cable #2, a USB port of the laptop computer 300 and a USB port 117 of the upper port set 110 are connected with each other via a bundle cable #3, a video output port (S-Video Out) of the laptop computer 300 and a video input port 118-1 of the upper port set 110 are connected with each other via a bundle cable #4.

FIG. 11 is a block diagram illustrating the connection between the upper port set 110 and the laptop computer 300 using a docking connector 700 as shown in FIG. 14. As compared to FIG. 4, the speaker/amplifier input port 115, the microphone connection part 116, the USB port 117, and the video input port 118-1 of the upper port set 110 and a connection port for supplying power from the power supply unit 510 of the laptop station to the laptop computer are connected to a single connector.

FIG. 12 is a block diagram illustrating the connection of the lower port set 221 when the docking connector 700 is used, and FIG. 13 is a block diagram illustrating the connection between the upper port set 110 and the laptop computer 300 using the docking connector 700. As shown in FIG. 13, the speaker/amplifier input port 115, the microphone connection part 116, the USB port 117, and the video input port 118-1 of the upper port set 110 are connected to the laptop computer 300 via the docking connector 700. Furthermore, power is supplied from the power supply unit 510 of the laptop station to the laptop computer via the docking connector 700. Consequently, the laptop table according to the present invention can be more conveniently used.

Meanwhile, various ports included in the port set provided at the laptop station 100 as described above may be manufactured in the form of a single docking connector, which is mounted in the laptop station 100. Also, the docking connector may be fixed to the laptop station such that the docking station can be connected to the docking connector connection ports of the laptop computer. Alternatively, the docking connector may be withdrawn from the laptop station such that the docking station can be directly connected to the docking connector connection ports of the laptop computer.

As shown in FIG. 10, a slot-type docking connector connection port, which transmits and receives various kinds of data and control signals to and from the laptop computer through a plurality of pins and supplies power to the laptop computer, is mounted at out side of the laptop station. The slot-type docking connector connection port is either connected to the docking connector 700 disposed at one side part of the laptop station or is connected to the respective ports via additional cables. Consequently, the laptop computer can be connected to either output ports of a receiving part disposed at the rear part of the laptop station or external devices. The functions of the respective pins of the docking connector are optionally decided by manufacturing companies depending upon kinds of products to be connected. The construction of the connector and the cable for connecting the connector of the laptop station and the connector of the laptop computer is well known, and therefore, a detailed description thereof will not be given.

A display unit 170 may be disposed at a predetermined position of an inclined protrusion 160 of the laptop station 100. For example, a small-sized LCD or a plurality of LEDs are disposed at the inclined protrusion 160 to monitor the connection or the operation of the above-described port set or connector. Specifically, power on/off, kind and operation state of the port connected, and the level of sound volume are displayed. In addition, other functions, such as a clock function, may be realized. Voltage or current at which the respective ports are connected is detected, and the level of the detected voltage or current is measured to light the LEDs, or predetermined characters or images are displayed on the LCD. This display technology is well known, and therefore, a detailed description thereof will not be given.

The laptop station 100 has an inclined part 140. At the lower end of the inclined part 140 is formed a wrist rest 120, which extends from the inclined part 140. The wrist rest 120 has a microphone 121 mounted therein. At the upper end of the wrist rest 120 is formed a stopping protrusion 130 for preventing the laptop computer from slipping from the inclined part. At the upper part of the inclined part 140 is formed an inclined protrusion 160, in which a plurality of speakers 161 are mounted.

Preferably, the wrist rest 120 is constructed such that wrists of a user are brought into tight contact with the wrist rest 120, and therefore, the user can use a keyboard of the laptop computer in a comfortable posture for a long period of time. The shape of the wrist rest 120 may be variously changed depending upon the physical conditions of users.

Also preferably, the stopping protrusion 130, which is formed at the upper end of the wrist rest 120, is perpendicular to the inclined part 140 or is concaved inward such that the lower end of the laptop computer is brought into tight contact with the stopping protrusion 130, and therefore, the laptop computer cannot move.

Also preferably, the inclined part 140, the wrist rest 120, and the inclined protrusion 160 of the laptop station 100 are integrally formed of a plastic material, by which the manufacturing costs and the assembly costs of the laptop station 100 are decreased.

At the inclined part 140 of the laptop station 100 is formed a plurality of fan grills, under which a plurality of fans 150 are mounted. When the laptop computer is placed on the laptop station 100, the laptop computer is cooled by the fans 150, and therefore, heat generated from the laptop computer is reduced. The number and the positions of the fans may be variously changed depending upon the sizes and the volumes of laptop computers placed on the laptop station.

The speakers 161 mounted inside the inclined protrusion 160 formed at the upper end of the inclined part 140 are driven by an audio amplifier, which is mounted in the inclined protrusion 160. Also, the speakers 161 receive an audio signal through a speaker port of the laptop computer, which is one of the components constituting the external port set, to output audio. Preferably, the speakers 161 are mounted opposite to the user of the laptop table.

Also, a mouse pad 190 necessary to use a mouse or a numeric keypad 191 may be mounted at the laptop station 100. Generally, most laptop computers do not include a numeric keypad including numeric keys from 0 to 9 and several functional keys, such as an enter key, except some large-sized laptop computers. When the numeric keypad 191 is used for a spread sheet or a calculation, however, work efficiency is greatly improved. The numeric keypad 191 is connected to the laptop computer through the USB port mounted in the laptop station 100. The numeric keypad 191 is mounted at a predetermined position of the laptop station 100 where the user can easily and conveniently use the numeric keypad 191, for example, the left side part or the right side part of the laptop station 100, in the form of a module. The numeric keypad 191 may be covered by a numeric keypad cover such that the numeric keypad 191 can be appropriately protected when not in use. When the numeric keypad 191 is used, the numeric keypad cover is removed, and, when the numeric keypad 191 is not used, the numeric keypad 191 is covered by the numeric keypad cover. Consequently, the convenience of use is improved. Also, the mouse pad 190 is used to effectively prevent the malfunction of an optical mouse (not shown) placed on the mouse pad 190 and to improve the use sensitivity of the optical mouse. The mouse pad 190 may be fixed to a predetermined position of the laptop station. Alternatively, the mouse pad 190 may be detachably attached to the predetermined position of the laptop station.

The movable exclusive table 200 includes a supporting plate 220 for supporting the laptop station 100, a height adjustment bar 230 attached to the lower part of the supporting plate 220, a supporting frame 240 fitted in the height adjustment bar 230 such that the height of the height adjustment bar 230 can be adjusted by a height adjusting knob 242, which is mounted at the supporting frame 240, and a plurality of roller parts 250 mounted at the lower ends of the supporting frame 240 such that the roller parts 250 can be rotated 360 degrees.

The supporting plate 220 may comprise a lower supporting plate directly connected to the height adjustment bar 230 and an upper supporting plate disposed on the lower supporting plate such that the laptop station is placed on the upper supporting plate. The upper supporting plate is made of a plastic material.

Each of the roller parts 250 mounted at the ends of the supporting frame 240 comprises a mounting member 251 and a roller 252. The mounting members 251 are fitted in the ends of the supporting frame 240, and are then fixed to the ends of the supporting frame 240 by means of mounting screws 253. The rollers 252 are mounted in the mounting members 251, respectively, such that the rollers 252 can be rotated 360 degrees.

Preferably, through-holes are formed at predetermined positions of the mounting members 251 where the mounting members 251 are fitted in the supporting frame 240, and then mounting screws 253 are inserted through the through-holes, whereby the mounting members 251 are fixed to the supporting frame 240. The mounting members 251 are easily separated from the supporting frame 240 by removing the mounting screws 253 from the through-holes.

Also preferably, the rollers 252 slightly protrude downward from the mounting members 251 such that the roller parts 250 can fit beneath a sofa and can be removed from beneath the sofa, even when the sofa has a small distance from the floor.

FIG. 7 is a perspective view of the laptop table according to the first preferred embodiment of the present invention shown in FIG. 1 illustrating the rear part of the laptop station 100. At the rear part of the laptop station 100 is formed a receiving part 180 for receiving a power cable and an AC adaptor of the laptop computer, as shown in FIG. 7. In the receiving part 180 is mounted an AC outlet 181, by which the power cable is connected to the upper power supply unit 110. Meanwhile, the output ports corresponding to the port set or the docking connector may be disposed at the rear part of the laptop station 100. The output ports receive signals from the laptop computer through the port set of the laptop station or the connector and output the received signals to external devices, for example, various USB-type peripheral devices. Through the above-described construction, the user of the laptop computer can easily and conveniently connect the laptop computer with the external devices.

In a receiving space provided in the receiving part 180 may be received various external small-sized devices connectable through the USB port for the laptop computer or the like.

The various devices received in the receiving part 180 are supplied with power through the AC outlet 181 disposed in the receiving part 180 or the USB port in the receiving space. The AC outlet 181 is electrically connected to the upper power supply unit 110 such that the AC outlet 181 can receive power from the upper power supply unit 110.

A storage unit 580, such as a hard disk drive and a flash memory set, is mounted in the laptop station. Furthermore, an optical storage unit 570, such as a CD/DVD ROM drive, is mounted in the laptop computer. Consequently, it is possible for a user to easily install music, movies, or programs.

Referring to FIG. 15, an automatic execution file (AUTOEXEC.bat) is included in a controller of the storage unit 580, such as the hard disk drive (HDD) or the flash memory set, mounted in the laptop station. When the connector connection port of the laptop computer is connected with the docking connector of the laptop station, Internet connection is automatically executed from the laptop computer. When a user accepts disclaimer after the laptop computer is connected to a host computer via Internet, basic information of the user of the laptop station is stored in the host computer. Subsequently, when the user requests that all the files stored in the laptop computer be copied to the storage unit in the laptop station, a command XCOPY in a Window operating system (Windows 95, 98, ME, XP) of the laptop computer of the user (in the directory of C:\windows\command) is executed such that data in the laptop computer is copied to a backup exclusive partition of the storage unit of the laptop station, whereby backup files are created. After that, the user is informed of a data backup completion message or an error message.

At the rear part of the laptop station 100 is hingedly mounted a cover 182 for covering the receiving part 180. At the rear part of the laptop station 100 on both sides of the receiving part 180 are formed fan grills through which air circulated by the fans 150 mounted in the inclined part 140 is introduced into or discharged from the laptop station 100.

FIGS. 8 and 9 are sectional views respectively illustrating the operation of the engagement part of the laptop table according to the first preferred embodiment of the present invention shown in FIG. 1. FIG. 8 is a sectional view before the operation of the engagement part is performed, and FIG. 9 is a sectional view after the operation of the engagement part is performed. As shown in FIGS. 8 and 9, the engagement unit 210 comprises: engaging plates 212 hingedly connected to the opposite sides and the rear end of the supporting plate 220 of the movable exclusive table 200 such that the engaging plates can be rotated in a hinged fashion; and engaging grooves 211 formed at the laptop station 100 such that the engaging grooves 211 correspond to the engaging plates 212, respectively, the engaging plates 212 being securely engaged in the corresponding engaging grooves 211 while hook parts formed at the ends of the engaging plates 212 are caught by catching protrusions 213 formed in the engaging grooves 211, respectively. The engaging grooves 211 having the catching protrusions 213 are formed at the opposite sides and the rear end of the laptop station 100 such that the user can pull the laptop station 100 toward him/her until the laptop station 100 is placed at a desired position, and then the user can use the laptop station 100 while the laptop station 100 is coupled with the movable exclusive table 200.

As apparent from the above description, the laptop station, at which the external port set and the power supply units of the laptop computer are integrally formed, is securely fixed to the movable exclusive table, or the laptop station is easily and conveniently separated from the movable exclusive table. Consequently, the present invention has the effect of allowing a user to use the laptop computer in a comfortable posture while the user does not need to concern himself/herself with arrangement of the peripheral accessories of the laptop computer.

Also, the power supply units are mounted at the rear part of the laptop station and the height adjustment bar, and therefore, connection to the power source required to use the laptop computer is easily accomplished irrespective of the location of the laptop computer or electric outlet. Consequently, the present invention has the effect of accomplishing various connections to the external devices.

Also, the plurality of fans are mounted in the inclined part of the laptop station such that heat generated from the laptop computer is reduced, and therefore, overheating of the laptop computer is prevented. Consequently, the present invention has the effect of enabling the laptop computer to be used for an extended period of time.

Also, the sound output from the laptop computer is further increased by means of the amplifier and speakers mounted in the laptop station and the subwoofer mounted at the lower end of the movable exclusive table. Consequently, the present invention has the effect of enabling the laptop computer to provide quality sound to the user of the laptop computer.

Furthermore, the power cable, the adaptor, and other cables for the laptop computer are neatly received in the receiving part formed at the rear part of the laptop station, and the receiving space power supply unit, by which the power cable is connected to the upper power supply unit, is mounted in the receiving part. As a result, the arrangement of the cables is easily and conveniently accomplished when the laptop computer is used, and no additional power cable for power connection is necessary. Consequently, the present invention has the effect of considerably reducing the number of cables necessary to use the laptop computer.

In addition, when the laptop computer is connected to the laptop station, the data stored in the laptop computer can be automatically backed up to the storage unit, such as a hard disk drive or a flash memory set, mounted in the laptop station. Consequently, the present invention has the effect of preventing data loss due to errors.

Also, the optical storage unit, such as a CD/DVD ROM drive, can be mounted in the laptop station. Consequently, the present invention has the effect of allowing a user to easily download music, movies, or programs.

Furthermore, various additional devices necessary for the laptop computer are provided at the laptop station or the laptop table. Consequently, the present invention has the effect of greatly reducing the weight of the laptop computer and improving the mobility and convenience of the laptop computer.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A laptop table comprising:
   a movable exclusive table having a supporting plate;
   a laptop station disposed on the supporting plate, the laptop station having a connection port set and a power supply unit integrally mounted therein, the connection port set and the power supply unit of the laptop station being connected to an external port set and a power supply unit of a laptop computer; and
   an engagement unit formed at opposite sides and the rear end of the laptop station and at the supporting plate of the movable exclusive table for engaging or disengaging the laptop station with or from the supporting plate of the movable exclusive table, wherein the engagement unit comprises:
      engaging plates hingedly connected to the opposite sides and the rear end of the supporting plate of the movable exclusive table such that the engaging plates can be rotated in a hinged fashion; and
      engaging grooves formed in the laptop station such that the engaging grooves correspond to the engaging plates, respectively, each of the engaging grooves having a catching protrusion formed therein,
      wherein each of the engaging plates has a hook part formed at the end thereof such that the hook part can be caught by the corresponding catching protrusion.

2. The laptop table as set forth in claim 1, wherein the movable exclusive table includes:
   the supporting plate;
   a height adjustment bar vertically attached to the supporting plate;
   a supporting frame fitted in the height adjustment bar such that the height of the height adjustment bar can be adjusted by a height adjusting knob.

3. The laptop table as set forth in claim 2, further comprising:
   a complex case disposed at the height adjustment bar such that a wireless router and/or a modem for wireless Internet or a subwoofer and an amplifier for the subwoofer is mounted in the case.

4. The laptop table as set forth in claim 2, wherein the height adjustment bar is provided at one side thereof with a video input and output port, a power switch, and a plug receptacle.

5. The laptop table as set forth in claim 1, wherein the laptop station includes:
   an inclined part;
   a wrist rest formed at the lower end of the inclined part, the wrist rest extending from the inclined part; and
   an inclined protrusion formed at the upper end of the inclined part, the inclined protrusion having a plurality of speakers mounted therein.

6. The laptop table as set forth in claim 5, wherein the inclined part, the wrist rest, and the inclined protrusion of the laptop station are integrally formed.

7. The laptop table as set forth in claim 5, wherein the laptop station further includes:
   a stopping protrusion formed at the upper end of the wrist rest for preventing the laptop computer from slipping from the inclined part.

8. The laptop table as set forth in claim 5, wherein the laptop station further includes:
   a numeric keypad mounted at one side part of the inclined part.

9. The laptop table as set forth in claim 5, wherein the laptop station further includes:
   a microphone mounted in the wrist rest.

10. The laptop table as set forth in claim 5, wherein the laptop station further includes:
    a plurality of fan grills formed at the inclined part; and
    a plurality of fans mounted in the fan grills.

11. The laptop table as set forth in claim 1, wherein the laptop station is provided at one side thereof with a port set including at least one selected from a group consisting of a microphone connection port, a speaker/amplifier input port, a woofer signal output port, a universal serial bus (USB) port, a video input and output port for an S-video cable, a high-definition multimedia interface (HDMI) cable, an IEEE 1394 cable, or a component video output (Y/Pb/Pr) cable, a volume switch, a fan power switch, an amplifier power switch, and a plug receptacle.

12. The laptop table as set forth in claim 1, wherein the laptop station is provided at one side thereof with a connector port including at least one selected from a group consisting of a microphone connection port, a speaker/amplifier input port, a USB port, a video input and output port, and a power port, the connector port being connected to a connection port for a docking station of the laptop computer or the respective ports of the laptop computer.

13. The laptop table as set forth in claim 1, wherein the laptop station has a display unit for monitoring the connection and the operation of the port set or the connector.

14. The laptop table as set forth in claim 1, wherein the laptop station is provided at the rear part thereof with a receiving part for receiving a power adaptor and a power cable of the laptop computer.

15. The laptop table as set forth in claim 14, wherein the receiving part has an input and output port including a USB port and/or a receiving power supply unit.

16. The laptop table as set forth in claim 1, wherein the laptop station has a wireless mouse receiver.

17. The laptop table as set forth in claim 1, wherein the laptop station has a data storage unit.

18. The laptop table as set forth in claim 17, wherein the data storage unit includes at least one of a hard disk drive, a flash memory, and a CD/DVD ROM drive.

19. The laptop table as set forth in claim 17, wherein the data storage unit has an automatic executable file included therein, whereby, when the laptop computer is connected to the laptop table, data stored in the laptop computer is automatically backed up to the data storage unit through the connection via Internet.

20. The laptop table as set forth in claim 14, wherein the laptop station is provided at the rear part thereof on both sides of the receiving part with fan grills for circulating air.

21. The laptop table as set forth in claim 1, wherein at least two engaging grooves are formed on each of two opposite sides of the laptop station, and wherein the laptop station can be securely engaged to the supporting plate in at least two different positions on the supporting plate depending on which of the engaging grooves are engaged with the engaging plates of the engagement unit.

22. The laptop table as set forth in claim 21, wherein a lower side of the laptop station is in contact with the supporting plate when the laptop station is securely engaged to the supporting plate in any of the at least two different positions.

23. The laptop table as set forth in claim 21, wherein at least one of the at least two engaging grooves formed on each side of the laptop station is not engaged with an engaging plate when the laptop station is securely engaged to the supporting plate.

24. The laptop station as set forth in claim 23, wherein the laptop station can be selectively engaged to the supporting plate in a position closer to or further from a user of the laptop station depending on which of the engaging grooves are engaged.

* * * * *